United States Patent [19]

Corley

[11] Patent Number: 4,991,007
[45] Date of Patent: Feb. 5, 1991

[54] IMAGE EVALUATION OF AT LEAST ONE CHARACTERISTIC OF AN OBJECT, AND METHOD OF EVALUATION

[76] Inventor: Ferrand D. E. Corley, 80 Kleins Crescent, Kleinsberg, Ontario, Canada, L0G 1C0

[21] Appl. No.: 347,675

[22] Filed: May 5, 1989

[51] Int. Cl.⁵ .............................................. H04N 7/18
[52] U.S. Cl. ..................... 358/106; 358/101
[58] Field of Search ................. 358/106, 139, 93, 185, 358/10, 22, 107, 214

[56] References Cited

U.S. PATENT DOCUMENTS

| | | | |
|---|---|---|---|
| 3,969,577 | 7/1976 | Lloyd et al. | 358/106 |
| 4,146,907 | 3/1979 | Jensen et al. | 358/214 X |
| 4,180,829 | 12/1979 | Pires | 358/139 X |
| 4,389,669 | 6/1983 | Epstein et al. | 358/101 |
| 4,481,533 | 11/1984 | Altmann et al. | 358/101 |
| 4,579,455 | 4/1986 | Levy et al. | 358/106 X |
| 4,675,725 | 6/1987 | Parkyn | 358/22 |
| 4,692,800 | 9/1987 | Yoshida | 358/106 |
| 4,783,826 | 11/1988 | Koso | 358/106 X |
| 4,809,341 | 2/1989 | Matsui et al. | 358/106 X |

OTHER PUBLICATIONS

Tektronix Technical Literature (4 pages), no date.
Quantum Data Technical Literature (15 pages), no date.

Primary Examiner—Victor R. Kostak

[57] ABSTRACT

A system and method for evaluating a visual image characteristic, such as the brightness, color, tonal scale, geometric linearity, sharpness and/or position, of an electronic image signal, such as obtained, for example, from a television camera. The image signals, including an image of a test target, pass to an image combiner. A reference image signal from a reference signal generator also passes to the image combiner and a combined signal then passes to a monitor on which the image of the test target and the reference image are displayed in juxtaposition for comparison. An adjustable image signal modifier adapted to modify the desired signal characteristic can be provided between the camera and the combiner. An operator then adjusts the image signal modifier until the selected characteristic of the two images as displayed have a predetermined relationship. The extent of such modification can also provide a quantification of the deviation of the image of the test target from a predetermined relationship with the reference image for the selected characteristic. Further image signals appropriately modified as obtained from the image signal modifier can be transmitted or recorded for later dissemination. Quantification of the deviation can also be obtained by recording the required modification of the reference image signal.

20 Claims, 3 Drawing Sheets

IMAGE EVALUATION OF AT LEAST ONE CHARACTERISTIC OF AN OBJECT, AND METHOD OF EVALUATION

FIELD OF THE INVENTION

The invention relates to image evaluation systems by means of which one or more visual image characteristics of the image of a test target, as provided, for example, by a television camera, can be compared to the same characteristic or characteristics of a reference image. Such comparison permits the quantification of the deviation of the test target image from the reference image. Additionally, the signals representing the test target image can be modified so as then to have predetermined relationship to the reference image with respect to one or more visual image characteristics. The invention is applicable to the evaluation and/or modification of electrical image signals as provided, for example, by a television camera as well as to evaluating and controlling the production of photographic images.

BACKGROUND OF THE INVENTION

It is well known that, in systems using imaging devices such as television cameras, telecine cameras and the like, the visual image characteristics of the scene being viewed are at times incorrectly reproduced. For example, the use of such imaging devices frequently introduces distortion or deviation into such visual image characteristics as colour, brightness, tonal scale, geometric linearity, sharpness and position. In the same way photographic film techniques similarly cause distortion in the recorded images.

In an attempt to alleviate these problems, it is customary to incorporate adjustment means in imaging devices such as television cameras to allow visual image characteristic adjustment. For the same reason, it is well known to provide photographic cameras with similar adjustment means, such as filters, whereby the colour balance, brightness and/or other visual image characteristic of the scene being photographed can be adjusted.

In the majority of cases, these adjustments are intended to produce an image which is a reproduction of the scene which is as faithful as possible under a specific illumination. However, this is not the only reason for making such adjustments. In some cases, it is desired to deliberately change the colour balance, brightness and/or some other visual image characteristic of the image of the scene, for artistic or other reasons.

Many different factors affect the quality of the images produced by such imaging devices or cameras. These factors include the spectral characteristics of the illuminating light source, the absorption spectrum of the scene, and the transmission characteristics of the glassware, i.e., the lens, splitting blocks, etc., the cross-over wave lengths of the dichroic image dividers, the transmission wave bands of the trim filters, and the characteristics of the image sensing components of the telecine or video camera itself. Additionally, the optical systems of such devices can introduce geometric distortion.

For many years, the method used to evaluate the signals produced by imaging devices such as television cameras has been to aim the camera at a test target comprising one or more patterns representing a range of values for the particular visual image characteristic. The electrical signals produced by the camera, when aimed at such a target, were then evaluated. This evaluation was either objective, i.e., the signals were observed and measured on instruments such as wave-form monitors and vectorscopes. Alternatively, the image represented by such signals was evaluated subjectively. For example, by passing such signals to an accurately aligned colour monitor, the resulting image of the test target could be viewed and subjectively evaluated.

Having so evaluated the image signal of the test target, any necessary corrections and adjustments could then theoretically be made by passing the signal through an image signal modifier adapted to adjust the selected visual image characteristic of the image signal. The same adjustment would then be made to the image signals provided by the imaging device or camera while actual scenes were being shot. Such image signal modifiers are known in the industry, and incorporate controls for adjusting the colour balance, brightness and/or other visual image characteristics of a signal, prior to dissemination, whether by broadcasting over the air waves, or through a closed circuit or the like. Such modifiers were used to adjust and/or correct the selected visual image characteristic(s) of the image signals.

While these known systems produced considerable improvements in the quality of the image disseminated, or broadcast, and produced on a screen or monitor, problems still arose.

For example, if such an image signal is evaluated in a device such as a wave-form monitor or vectorscope, it is well known that such equipment is less sensitive than the human eye, and will overlook subtle differences which would be readily apparent to the human eye. Such images are subjective by nature, and can be seriously impaired by relatively minor errors. For example, a difference of ten IRE units, as measured on a wave-form monitor, in the blue channel, will not necessarily appear as the same difference in brightness as a difference of ten IRE units on the read channel, when both are viewed on a colour monitor.

The human eye can, however, immediately detect such a difference.

On the other hand, where the image produced by the imaging device from the test target is displaced on a colour monitor for subjective evaluation, it is necessary for an observe to compare the image displayed on the colour monitor with the actual test target itself. These may be at a distance from one another, viewed under different lighting conditions, or of different colour temperatures. These factors may make it difficult to make a judgement concerning any adjustment that may be required.

A further disadvantage of earlier systems was the fact that, even when the image of the test target was reproduced on a monitor, the test image, even when the camera has been adjusted, would still not necessarily reproduce the various colours in a theoretically optimized manner. Imperfections arose, whether produced by imperfections in the colour monitor, or by the manner in which the target was illuminated, or by an imperfect imaging device.

These imperfections were, in turn, carried over, in the case of, for example, a television broadcast, in the image signals broadcast by the system, and were then reproduced on monitors or television sets in homes.

In the case of photographic film cameras, it is customary to simply photograph a scene using the camera with a selected filter attached. After the film has been exposed and developed, and prior to or during dissemination of the film, e.g., by screening for television, the image of the film could be evaluated subjectively by observing the photographic reproduction of the scene. If necessary, the filter could then be changed, or other adjustments made in an attempt to obtain a more faithful reproduction.

In would clearly be desirable, if were possible to evaluate image signals in a more accurate manner and, if desired, to modify or adjust one or more visual image characteristics of such signals so that such signals as subsequently disseminated or broadcast would conform more closely to a faithful reproduction of the scene being viewed. In this way, imperfections in the image as reproduced and seen would be reduced; the image as actually seen, for example, on a monitor or television set would be as close to perfect as was possible.

It would also be desirable if it were similarly possible by the use of a visual image modifier to modify visual image characteristics of such image signals so as deliberately to distort one or more characteristics of the image, for artistic or other effects. It could be desirable, for example, to do this after the scene had been photographed or recorded by the imaging device by passing the signal through a image signal adjusting device. The invention is not, therefore, restricted solely to evaluating and possibly correcting for errors or deficiencies in visual image characteristics but also encompasses deliberately distorting such visual image characteristics where desired.

The term 37 modifying" as used herein is intended to encompass both correcting and distorting of one or more visual image characteristics relative to a predetermined value for such characteristic.

BRIEF SUMMARY OF THE INVENTION

With a view to overcoming these various problems, the invention provides an image evaluation system for evaluating image signals, said image signals including a signal representing an image of a test target, said test target having a first predetermined visual appearance for a predetermined visual image characteristic and said system comprising a reference image signal generator adapted to generate a reference image signal representing a reference image having a second predetermined visual appearance for said predetermined visual image characteristic and having a predetermined relationship to said first predetermined visual appearance; a signal-combining means adapted to receive said image signals and said reference image signal and to combine said signals into a combined signal; and, a monitor connected to said signal-combining means so as to receive said combined signal therefrom, whereby said monitor will display said predetermined image characteristic of each of said image of said test target and said reference image adjacent to one another to permit comparison thereof.

The invention also provides method of evaluating image signals, said image signals including a signal representing an image of a test target having a first predetermined appearance for a predetermined visual image characteristic, and which method comprises the steps of generating a reference image signal representing a reference image having a second predetermined visual appearance for said predetermined visual image characteristic, said second predetermined visual appearance having a predetermined relationship to said first predetermined visual appearance for said predetermined visual image characteristic; combining said image signal of said test target and said reference image signal into a combined signal; passing said combined signal to a monitor; displaying said predetermined image characteristic of each said image of said test target and said reference image on said monitor adjacent to one another; comparing one said image with the other; and noting differences therebetween.

Typical visual image characteristics evaluated using the system and method of this invention are the colour, brightness, tonal scale, geometric linearity, sharpness and position of said images.

Usefully, an image evaluation system in accordance with this invention additionally comprises image signal-modifying means by means of which said image signals received by said signal-combining means can be modified so that said image of said test target and said reference image as displayed on said monitor then having a predetermined relationship with respect to said predetermined image characteristic.

By the use of such image signal-modifying means, it is possible to obtain a quantified indication of the extent to which said signal representing said image of said test target must be modified for said image of said test target and said reference image as displayed on said monitor to have a predetermined relationship with respect to said predetermined visual image characteristic.

An image evaluation system in accordance with this invention can also comprise an imaging device such as a television camera for providing said image signals. The image signal-modifying means can optionally be incorporated in said imaging device.

In one embodiment of this invention, the imaging device comprises an image conversion means for converting processed images including a processed image of said test target on photographic film into said image signals.

In another embodiment of this invention, the image evaluation system comprises reference image signal-modifying means by means of which said reference image signal received by said signal-combining means can be quantitatively modified so that said image of said test target and said reference image as displayed on said monitor then have a predetermined relationship with respect to said predetermined image characteristic in turn to permit there to be noted the extent of said modification further to allow said image signals subsequently to be modified that said images represented by said image signals have a predetermined relationship to said reference image with respect to said predetermined image characteristic.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will now be described merely by way of illustration with reference to the accompanying drawings in which.

DESCRIPTION OF THE PREFERRED EMBODIMENTS

Figure 1:
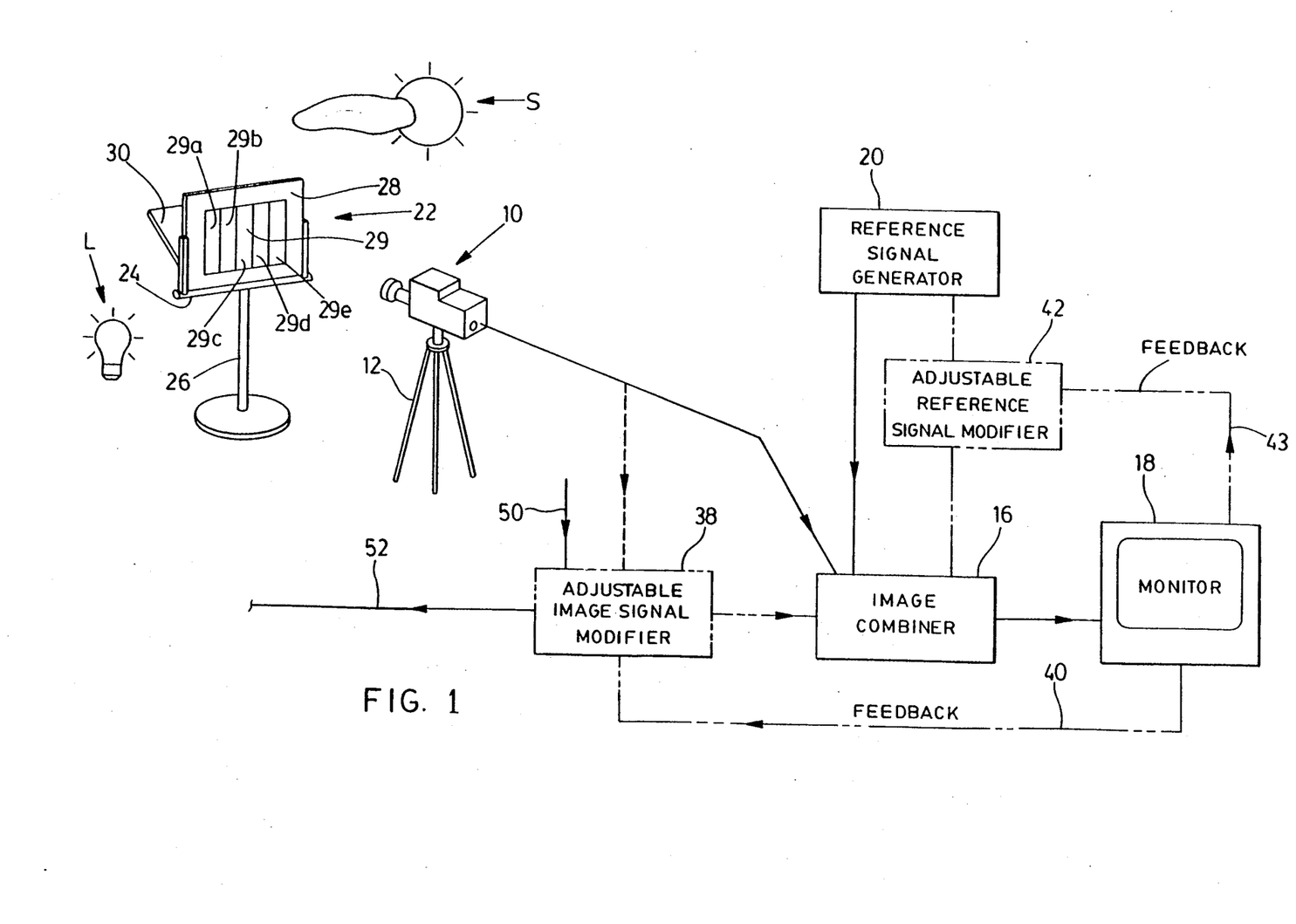
FIG. 1 is a partially schematic and partially perspective illustration of one embodiment of an image evaluation system in accordance with the invention and showing certain optional features in phantom outline.

Referring first of all to FIG. 1, there are illustrated therein in solid outline four principal components of one embodiment of an image evaluation system in accordance with this invention. The first component is an imaging device, which, in this case, it a television colour camera 10. The camera 10 may be hand-held or it may be mounted on a tripod 12 or other support as is well known in the art.

The camera 10 is in turn connected to an image combiner 16 which is adapted to combine two separate incoming signals into a single output signal. Such image combining devices are also currently available from several suppliers.

The image combiner 16 is, in turn, connected to a monitor 18 adapted to display the output signal from that image combiner 16. Generally, the monitor 18 will be a colour monitor although a monochrome monitor could be used if the use of the system was limited to evaluating non-colour or separated individual colour visual image characteristics.

A reference signal generator 20 is also connected to the image combiner 16 to supply thereto a reference image signal. Reference signal generators are also known and, therefore, require no detailed description herein.

One known reference signal generator is that manufactured by Quantum Data Inc., under the name "OPIX" (trade mark). This type of reference signal generator generates a specific test pattern for purposes distinct from the present invention.

The reference image signal results in the display on the monitor 18 of a reference image having a predetermined unique pattern with respect to one or more predetermined visual image characteristics.

The image evaluation system of FIG. 1 is also provided with a test pattern device generally indicated at 22 and which comprises a support 24 which, in turn, may be mounted on a suitable stand 26. A test panel 28, for example, of photographic film, supported on support 24 displays a suitable test target or pattern indicated schematically at 29.

Figure 3:
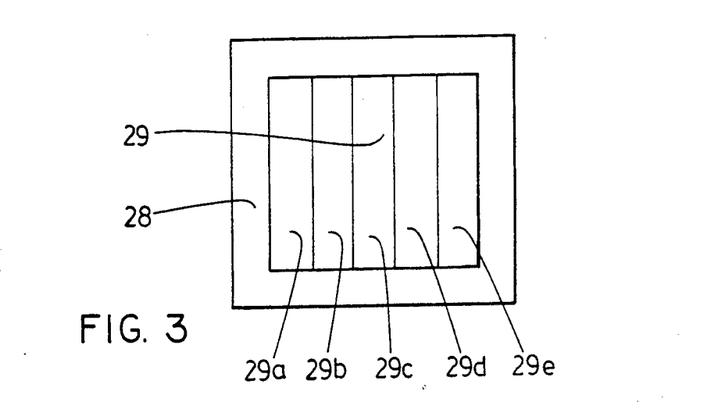
FIG. 3 is a simplified front elevation of a test target as can be used in the system shown in FIG. 1.

A typical but somewhat simplified test pattern is shown in FIG. 3. The separate vertical bars comprise different values for a predetermine visual image characteristic, such as colour, brightness, tonal scale and/or patterns adapted to be used to identify position linearity and/or sharpness. In practice, the test target 29 will be made up of different areas showing ranges of values for different visual image characteristics.

For example, such a tonal scale may comprise a plurality of separate grey bars 29a, 29b, 29c, 29d and 29e of progressively increasing or decreasing density, and may be produced in accordance with the invention described in U.S. Letters Pat. No. 3,552,288 entitled "Grey-Scale Test Slide", Inventor F. D. E. Corley.

The test pattern device 22 can usefully be manufactured in accordance with U.S. Letters Pat. No. 4,779,136. In this way, the test panel 28 may be illuminated by an appropriate combination of artificial light indicated by light bulb L and natural light indicated by sun S, or one or the other, depending upon the circumstances applicable at the particular scene where the camera or imaging device 10 is to be used.

In this way, as far as is possible, the lighting of the test panel 28 will faithfully reproduce the actual lighting falling on the scene to which the image device 10 is then to be directed.

As described in U.S. Pat. No. 4,779,136, a lighting screen 30 is mounted on the rearward side of support 24, and is adapted to be moved and rotated, so as to reflect and/or transmit interior artificial lighting, or exterior natural lighting, or both, onto the rearward side of test panel 28, and thus provide as far as possible a faithful reproduction of the actual illumination present at the scene.

It will, however, be appreciated that other forms of test pattern device 22 may be provided in certain circumstances. Some such test pattern devices may be illuminated by reflected light, i.e., the ambient light at the scene simply falling on the exposed surface, rather than illuminated from the rear in accordance with U.S. Letters Pat. No. 4,779,136.

In operation, camera 10 is aimed at the test pattern device 22. A signal representing an image of the test target is then passed directly to the image combiner 16 and then to the monitor 18.

Simultaneously, the reference signal generator 20 will generate a reference image signal representing a reference image having a predetermined visual appearance for the same visual image characteristic or characteristics as that or those of the test target 29. Such a reference image signal can be generated, for example, using known formulae relating values of the selected visual image characteristic to specific output signal voltage levels.

The image combiner 16 combines the signal from the camera 10 with the reference image signal from the reference signal generator 20 and passes the resulting combined signal to the monitor 18, on which those two images will then be displayed in juxtaposition.

Figure 4:
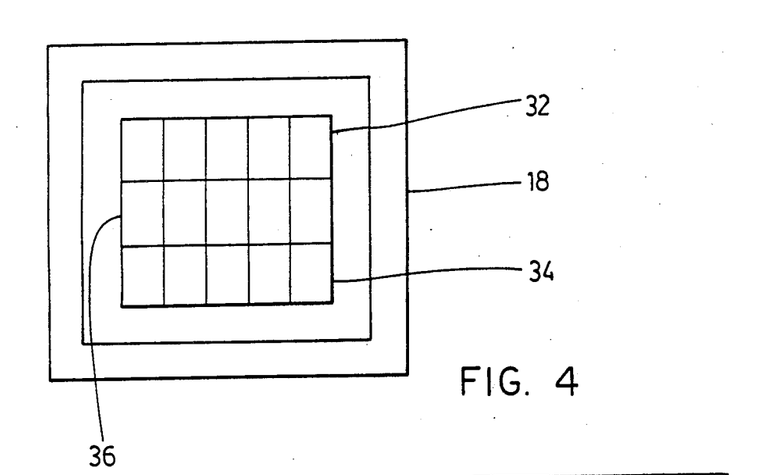
FIG. 4 is a view of a simplified monitor display obtained in operating the system as shown in FIG. 1.

The image combiner 16 is usefully adapted to split one of the two images into two spaced apart bands and to interpose the other signal between the two bands. For example, as shown in FIG. 4, the image combiner 16 is shown as being adapted to split the test image signal from the camera 10 so as to provide upper and lower bands 32 and 34 respectively, and to interpose the reference image as an intermediate band 36.

In this way, it is easy for an observer to discern differences in the desired visual image characteristic between any individual portions of the two images.

It is also within the scope of this invention to display the two images on the monitor 18 in other ways, for example, graphically.

Such differences between the predetermined visual image characteristics of the two images may simply be noted or, in accordance with an optional but useful feature of this invention, such differences can be measured or quantified.

One way of quantifying such differences is by the use of an adjustable image signal modifier shown in phantom outline at 38 and connected between the camera 10 and the image combiner 18.

Such image signal modifier 38 is adapted to modify the predetermined visual image characteristic of the image signals provided by the camera 10. For example, the signal modifier 10 can be adapted to modify the colour, brightness, tonal scale, position, geometric linearity, sharpness and/or other visual image characteristic(s) of such image signals.

Figure 2:
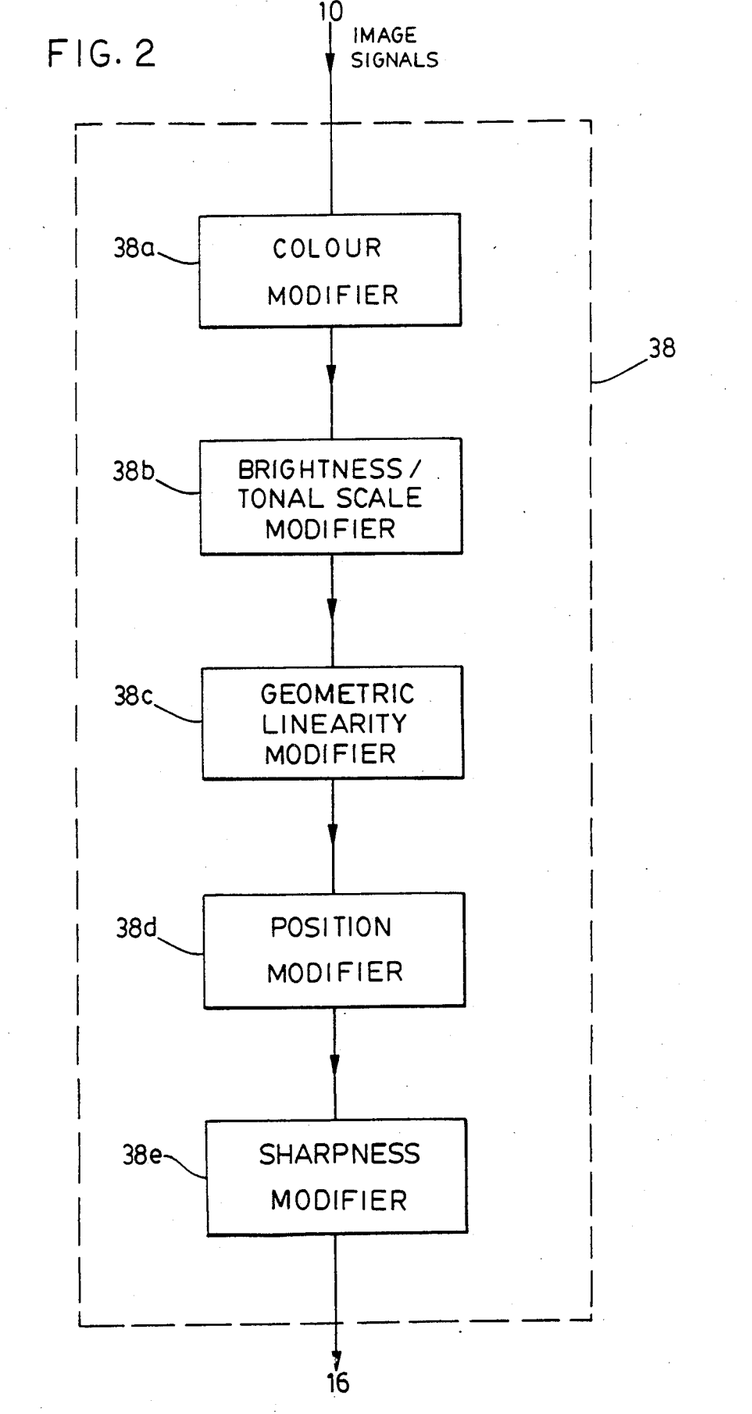
FIG. 2 is a more detailed illustration of one embodiment of an adjustable image signal modifier optionally used in the system illustrated in FIG. 1.

One embodiment of such an image signal modifier is shown in more detail in FIG. 2 from which it will be seen to comprise a colour modifier 38a, brightness/-tonal scale modifier 38b, a geometric linearity modifier 38c, a position modifier 38d, and a sharpness modifier 38e. It will be understood that all these sub-components will be adjustable to permit modification of the particular visual image characteristic. It should further be understood that the adjustable image signal modifier 38 of the system shown in FIG. 1 may comprise any one or more of the sub-components shown in FIG. 2, or even other sub-components. Such image signal modifiers are currently available from several manufacturers and require no further description herein.

In some cases, the camera 10 or other imaging device may itself incorporate means for adjusting the desired visual image characteristic. In such a case, no separate image signal modifier or modifiers will then be required.

By the use of such as image signal modifier, an observer is then able to adjust the controls of the image signal modifier 38 so as to modify the desired visual image characteristic of the test image. Such adjustment of feedback is indicated schematically in FIG. 1 by the legend 40. The modified signal will then be transmitted through the image combiner 16 to the monitor 18 to allow the operator to view the effect of such signal modification.

The feedback 40 can be manual or automatic. In the former case, an operator will simply adjust the controls of the image signal modifier 38 to obtain the desired result. Alternatively, signal comparator could be provided to generate a feedback signal to the image signal modifier 38 effective automatically to modify the signals in turn to provide the desired result.

As a result of such signal modification, the test image signal as provided by the imaging device 10 will be modified, as far as possible, for the test image to have a predetermined relationship with the reference image generated by the reference signal generator 20. Generally, the test image signal will be modified so, as far as possible, to make the test image and reference image as displayed on the monitor 18 identical to each other.

It is also with the scope of this invention for the reference signal generator 20 to provide a signal which is complementary to that desired to be obtained. In this embodiment, the image signal modifier 38 will be adjusted until the image of the test target becomes unidentifiable.

The extent to which the image signal modified must be adjusted so that the images displayed on the monitor have such a predetermined relationship can be noted so then to provide a quantification of the deviation of the unmodified image signal representing the image of the test target 29 from such a predetermined relationship with the reference image.

In accordance with another embodiment of this invention, such quantification can be achieved by the use of an adjustable reference signal modifier indicated in phantom outline at 42 which is connected between the reference signal generator 20 and the image combiner 16 and which is provided with controls whereby the reference signal generated by the generator 20 can be modified to vary the predetermined visual image characteristic of the reference image as displayed on the monitor 18.

In this arrangement, the reference signal modifier is adjusted until the predetermined visual image characteristic of the reference image and that of the image of the test target 29 as displayed on the monitor 18 have the desired predetermined relationship. Such adjustment or feedback, manual or automatic, is indicated schematically by the legend 43. By noting the extent to which the reference signal modifier 42 must be adjusted to obtain such a relationship is then noted to provide a quantification of the deviation of the image of the test target s displayed on the monitor from the desired value with respect to the selected visual image characteristic.

In accordance with another embodiment of this invention, the adjustable image signal modifier 38 is used to modify all image signals input thereto and not only the signal representing the image of the test target 29.

Such continuing modified output signals as provided by the image signal modifier 38 can then be recorded, for example, on video tape, or they may be broadcast, for example, directly to television stations for rebroadcasting to television receives. They may also be disseminated in other manners, for example, on a closed circuit or cable systems.

It will, of course, be appreciated that, while the image combiner 16 and the reference signal generator 20 are shown as separate components in FIG. 1, they could be combined in a single component system for the sake of simplicity, with suitable controls for both component parts.

Similarly, while the image signal modifier 38 and the image combiner 16 are shown as separate components, they can similarly be combined as a single component. In most cases, however, the image signal modifier 38 will be purchased as a separate unit. Alternatively, where the camera or other imaging device 10 has suitable adjustment controls of an adequate degree of sensitivity, the adjustments may be made in the imaging device 10 itself, without the image signals having to be passed through a separate image signal modifier.

It will thus be understood that, in this embodiment, the invention may be used to modify a visual image characteristic of the output or image signal from any imaging device. Alternatively the system may be used essentially to "reprocess" images already captured by an imaging device, either for direct dissemination, or for re-recording for example, on video tape or other medium, for retransmission later.

While the principal emphasis of the invention is on the evaluation and possible correction of imbalances in one or more visual image characteristics, the invention is equally applicable to the production of artistic or other desired effects by deliberately distorting one or more visual image characteristics in any manner desired by the operator of the system.

In all cases, the test image is compared to a standard or reference image. In the one case, the differences between the two images as displayed on the monitor 18 are simply noted in order to evaluate the quality of the test image.

In a second case, either the test target signal or the reference image signal is modified to provide a quantification of the deviation of the test image from a predetermined value as provided by the unmodified reference image.

In the third case, the test image is modified so as to bring it as close as possible into a predetermined relationship with the unmodified reference image and subsequent image signals from the imaging device are then modified in the same manner and to the same extent. In some cases, one or more colours or other visual characteristic of the test image can be deliberately distorted with reference to the reference image. As used herein, the term "modifying" is intended to encompass both functions, in the sense that by comparing the test image with the standard reference image, desired adjustments can be made either way.

Figure 5:
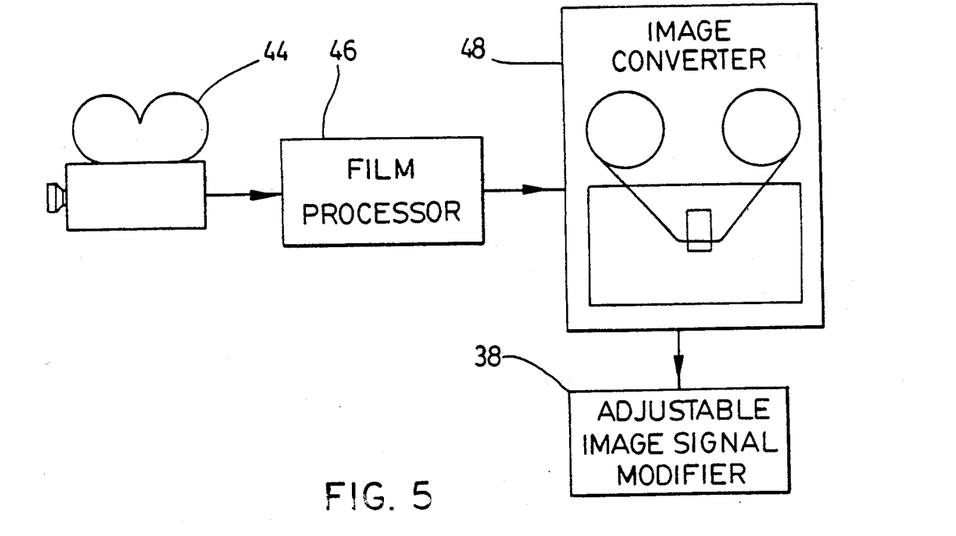
FIG. 5 illustrates another useful but alternative application of the system of the present invention.

In accordance with a further embodiment of the invention, as illustrated in FIG. 5, the invention is also applicable to use with photographic film cameras. As illustrated in FIG. 5, a photographic film camera 44 is shown, and exposed film from the camera is shown as being passed for processing to a processor 46.

An image converter or telecine 48 converts the images from the film into electrical signals. The signals are then passed through the remainder of the system as illustrated in FIGS. 1, i.e., to the image signal modifier 38, the image combiner 16, and the monitor 18. It will be understood that an image of an appropriate test target will be provided on the exposed film for comparison with a corresponding reference image from the reference signal generator 20. The images from the photographic film can thus be modified in the same way as described above in relation to the embodiment of FIG. 1, and either re-broadcast or disseminated directly, or re-recorded on video tape, or other recording media for use at another time.

The procedure in which the invention is used to measure or quantify the distortion of the test image as compared with a standard reference image is particularly useful in the case of photographic film. Once the colour or brightness distortion of photographic film has been quantified in accordance with the invention, then the film processing laboratory can process a further print of the film, adjusting the colour balance or other visual image characteristic of the film in accordance with the quantified degree of deviation.

The second print will then be closer to the standard reference image, and will thus be adapted to provide a higher quality image for dissemination, whether by broadcasting, projection, or on a closed circuit system. The invention is, therefore, of considerable utility in the upgrading of photographic motion picture film which otherwise would exhibit distortion, and such motion picture films may then simply be screened in motion picture houses.

It will thus be appreciated that the invention is not in any way restricted to the dissemination of image signals through a television or closed circuit system, but is directed simply to evaluating, upgrading, optimizing and/or otherwise modifying images captured on any form of medium. In this sense, the invention could also be utilized for upgrading images captured on "still" photographic film such as photographic slides, for example. Provided the test target was included in the "shoot" or roll of film being exposed, then the slide or print of the test target could then be checked against a reference image, and the film could then be reprinted suitable adjustments have been made in the processing technique; to optimize the desired visual image characteristic.

Referring once again to FIG. 1, it will be noted that there is also illustrated a further input cable 50 connected to the image signal modifier 38.

Such further input 50 may be used for coupling the image signal modifier 38 to other signal sources such as, for example, a video tape recorder, and/or a signal originating from another broadcasting station. In this way, signals originating other than directly from an imaging device 10, may also be modified in the manner described, provided that they also incorporate signals of a target image.

In addition, of course, such further input 50 can be coupled to a second imaging device or camera 10, since multiple cameras are used in many instances.

It will also be noted in FIG. 1 that a further output 52 is provided for outputting the modified signals from the image signal modifier 38. Such an additional output could be used for dissemination of the signals, either on closed circuit or by broadcast, since these modified signals would not be required to be passed through the image combiner 16.

A further advantage of the system, in accordance with the invention, is that the monitor 18 on which the test image and the reference image are compared, does not itself have to be perfectly aligned in order to serve the required purpose. If the monitor is misaligned, then it will distort both images equally. Consequently, differences between the test image and the reference image will still be revealed, and can still be corrected by adjusting the image signal modifier 38.

The foregoing is a description of a preferred embodiment of the invention which is given here by way of example only. The invention is not to be taken as limited to any of the specific features as described, but comprehends all such variations thereof as come within the appended claims.

What is claimed is:

1. An image evaluation system for evaluating at least one characteristic of image signals, said characteristic being selected form the colour, brightness, tonal scale, geometric linearity, sharpness and position of said image, and comprising:
   a test target having a first predetermined visual appearance for a selected one of said predetermined visual image characteristics;
   an imaging device for generating a test image signal representing an image of said test target when said test target is illuminated under predetermined lighting conditions and for generating subsequent image signals representing images of at least one scene illuminated under the same predetermined lighting conditions;
   a reference image signal generator adapted to generate a reference image signal representing a reference image having a second predetermined visual appearance for said selected one of said predetermined visual image characteristics and said second predetermined visual appearance having a predetermined relationship to said first predetermined visual appearance of said test target;
   a signal-combining means adapted to receive said test image signal and said reference image signal and to combine said signals into a combined signal; and,
   a monitor connected to said signal-combining means so as to receive said combined signal therefrom, thereby said monitor will display said predetermined image characteristic of said image of said test target and of said reference image adjacent to one another to permit comparison of said image of said test target and said reference image on said monitor.

2. An image evaluation system as claimed in claim 1 and which additionally comprises image signal-modifying means by means of which said test image signal and said subsequent image signals received by said signal-combining means can be modified so that said image of said test target and said reference image as displayed on said monitor then have a predetermined relationship with respect to said predetermined image characteristic.

3. An image evaluation system as claimed in claim 2 and in which said image signal-modifying means is adapted to provide a quantified indication of the extent to which said test image signal must be modified for said image of said test target and said reference images as displayed on said monitor to have a predetermined relationship with respect to said predetermined visual image characteristic.

4. An image evaluation system as claimed in claim 2 and in which said image signal-modifying means is incorporated in said imaging device.

5. An image evaluation system as claimed in claim 1 and in which said imaging device is a video camera.

6. An image evaluation system as claimed in claim 1 and in which said imaging device comprises an image conversion means for converting processed images existing on photographic film including a processed image of said test target into said image signals.

7. An image evaluation system as claimed in claim 1, wherein said signal-combining means is adapted to split one of said test image signal and said reference image signal into separate parts and to interpose at least a portion of the other of said image signals between said parts.

8. An image evaluation system as claimed in claim 1 and which additionally comprises reference image signal-modifying means by means of which said reference image signal received by said signal-combining means can be quantitatively modified so that said image of said test target and said reference image as displayed on said monitor have a predetermined relationship with respect to said predetermined image characteristic in turn to permit there to be noted the extent of said modification further to allow said subsequent image signals subsequently to be modified so that said images represented by said subsequent image signals have a predetermined relationship to said reference image with respect to said predetermined image characteristic.

9. A method of evaluating at least one characteristic of image signals, said characteristic being selected from the colour, brightness, tonal scale, geometric linearity, sharpness, and position of said image, and which method comprises the steps of:
generating a test image signal representing an image of a test target having a first predetermined visual appearance for a selected one of said predetermined visual image characteristics when said test target is illuminated under predetermined lighting conditions;
generating a reference image signal representing a reference image having a second predetermined visual appearance for said selected one of said predetermined visual image characteristics, said second predetermined visual appearance having a predetermined relationship to said first predetermined visual appearance for said selected one of said predetermined visual image characteristics;
combining said test image signal and said reference image signal into a combined signal;
passing said combined signal to a monitor;
displaying said predetermined image characteristic of each of said image of said test target and said reference image on said monitor adjacent to one another;
comparing one said image with the other;
noting differences therebetween, and,
generating subsequent image signals representing images of at least one scene illuminated under the same said predetermined lighting conditions as said test target.

10. A method as claimed in claim 9 and which comprises the additional step of modifying said test image signal so that said predetermined visual image characteristic of said image of said test target as displayed on said monitor has a predetermined relationship to said predetermined visual image characteristic of said reference image as also displayed on said monitor.

11. A method as claimed in claim 10 and which comprises quantifying the extent of said modification of said test image signal to provide a record of the extent of said modification.

12. A method as claimed in claim 10 and which comprises the step of continuing so to modify said subsequent image signals to the same extent so to provide modified images signals.

13. A method as claimed in claim 12 and which further comprises disseminating said modified signals.

14. A method as claimed in claim 12 and which further comprises recording said modified signals for subsequent dissemination.

15. A method as claimed in claim 9 and which comprises generating said test image signal and said subsequent image signals in a video camera.

16. A method as claimed in claim 9 and which comprises producing said test image signal and said subsequent image signals in an image conversion means adapted to convert processed images existing on photographic film including an image of said test target into said test image signal and said subsequent image signals.

17. A method as claimed in claim 9 and which additionally comprises quantitatively modifying said reference image signal so that said predetermined visual image characteristic of said reference image as displayed on said monitor assumes a predetermined relationship to said predetermined visual image characteristic of said image of said test target as also displayed on said monitor.

18. A method as claimed in claim 17 and which comprises the additional step of subsequently modifying said image signals in a manner related to the extent to which said reference image signal was modified.

19. An image evaluation system for evaluating image signals, said image signals including a signal representing an image of a test target, said test target having a first predetermined visual appearance for a predetermined visual image characteristic and said system comprising:
a reference image signal generator adapted to generate a reference image signal representing a reference image having a second predetermined visual appearance for said predetermined visual image characteristic and having a predetermined relationship to said first predetermined visual appearance;
a signal-combining means adapted to receive said image signals and said reference image signal, to split one of said image signal of said test target and said reference image signal into separate parts and to interpose at least a portion of the other of said image signals between said parts, and to combine said signals into a combined signal; and, a monitor connected to said signal-combining means so as to receive said combined signal therefrom, whereby said monitor will display said predetermined image characteristic of each said image of said test target and said reference image adjacent to one another to permit comparison thereof.

20. An image evaluation system for evaluating image signals, said image signals including a signal representing an image of a test target, said test target having a first predetermined visual appearance for a predetermined visual image characteristic selected from the colour, brightness, tonal scale, geometric linearity, sharpness and position of said images and said system comprising:

a reference image signal generator adapted to generate a reference image signal representing a reference image having a second predetermined visual appearance for said predetermined visual image characteristic and having a predetermined relationship to said first predetermined visual appearance;

a signal-combining means adapted to receive said image signals and said reference image signal, to split one of said image signal of said test target and said reference image signal into separate parts and to interpose at least a portion of the other of said image signals between said parts, and to combine said signals into a combined signal; and, a monitor connected to said signal-combining means so as to receive said combined signal therefrom, whereby said monitor will display said predetermined image characteristic of each said image of said test target and said reference image adjacent to one another to permit comparison thereof.

* * * * *